(12) United States Patent
Fujimoto

(10) Patent No.: US 10,011,691 B2
(45) Date of Patent: Jul. 3, 2018

(54) FLUORORUBBER MOLDED PRODUCT AND METHOD FOR MANUFACTURING THE SAME

(71) Applicant: SUMITOMO RUBBER INDUSTRIES, LTD., Kobe-shi, Hyogo (JP)

(72) Inventor: Kentaro Fujimoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 522 days.

(21) Appl. No.: 14/624,187

(22) Filed: Feb. 17, 2015

(65) Prior Publication Data
US 2015/0252151 A1 Sep. 10, 2015

(30) Foreign Application Priority Data
Mar. 4, 2014 (JP) ................................. 2014-041953

(51) Int. Cl.
C08J 3/24 (2006.01)
B05D 1/18 (2006.01)
C08J 3/09 (2006.01)
C08J 7/02 (2006.01)

(52) U.S. Cl.
CPC ............... *C08J 3/244* (2013.01); *B05D 1/18* (2013.01); *C08J 3/093* (2013.01); *C08J 7/02* (2013.01); *B05D 2201/02* (2013.01); *B05D 2506/10* (2013.01); *C08J 2300/26* (2013.01); *C08J 2315/02* (2013.01); *C08J 2327/16* (2013.01); *Y10T 428/3154* (2015.04)

(58) Field of Classification Search
None
See application file for complete search history.

(56) References Cited

U.S. PATENT DOCUMENTS

| | | | |
|---|---|---|---|
| 7,915,361 B2* | 3/2011 | Morikawa | C08F 214/18 526/247 |
| 2003/0232919 A1 | 12/2003 | Osawa | |
| 2005/0197458 A1* | 9/2005 | Kuboyama | C08F 8/00 525/191 |
| 2006/0046043 A1* | 3/2006 | Tani | G03G 7/002 428/292.1 |
| 2010/0239867 A1* | 9/2010 | Tsuchiya | C09K 3/1009 428/422 |

FOREIGN PATENT DOCUMENTS

| | | |
|---|---|---|
| JP | 2004-10808 A | 1/2004 |
| JP | 2011-148902 A | 8/2011 |
| JP | 2012-57172 A | 3/2012 |
| JP | 4992897 B2 | 8/2012 |
| WO | WO 2005/028547 A1 | 3/2005 |

OTHER PUBLICATIONS

3M Japan, Inc., "A Fluorine System Inactivity Liquid," Retrieved from URL:http://www.mmm.co.jp/emsd/fluorinert.html#dtl-04, dated Nov. 8, 2014 (retrieved Sep. 11, 2017), 4 pages.
3M Japan, Inc., "FC-770: Safe Data Sheet," 4th Ed., Retrieved from URL:http://multimedia.3m.com/mws/mediawebserver?mwsid=TTTTTV7o0_VyM9hTNYgd5yu7pwvK2dv_IwVAQ_H7oTTTTT, Mar. 18, 2016 (retrieved Sep. 11, 2017), pp. 1-9.
Author Unknown, "HCFC-225 Safe Data Sheet," A Japanese Fluorocarbon Association, Retrieved from URL:http:www.fjma.org/msds/HCFC-225.pdf, Jun. 8, 1993 (Apr. 1, 2015 revision; retrieved Sep. 8, 2017), pp. 1-7.
Japanese Notification of Reasons for Refusal for Japanese Application No. 2014-041953, dated Sep. 21, 2017, with a machine translation.
SIGMA-ALDRICH, "Fluorinert® FC-77," URL:http:www.sigmaaldrich.com/MSDS/MSDS/DisplayMSDSPage.do?country=JP&language=ja&productNumber=47090&brand=SIAL&PageToGoToURL=http%3A%2F%2Fwww.sigmaaldrich.com%2Fcatalog%2Fproduct%2Fsial%2F47090%3Flang%3Dja, May 23, 2012 pp. 1-5.

* cited by examiner

*Primary Examiner* — Nicole M Buie-Hatcher
(74) *Attorney, Agent, or Firm* — Birch, Stewart, Kolasch & Birch, LLP

(57) ABSTRACT

A fluororubber molded product according to the present invention is obtained by the steps of molding and crosslinking a fluororubber composition and thereafter immersing the composition in a fluorocarbon or an aqueous solution containing a fluorocarbon at a concentration of not less than 10% by volume.

6 Claims, 1 Drawing Sheet

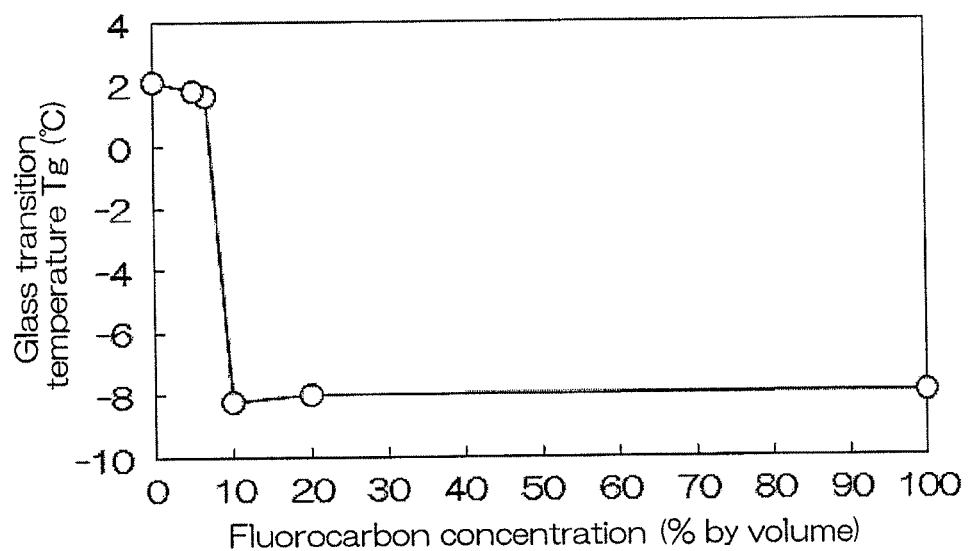

FLUORORUBBER MOLDED PRODUCT AND METHOD FOR MANUFACTURING THE SAME

CROSS-REFERENCE TO RELATED APPLICATIONS

The present application corresponds to Japanese Patent Application No. 2014-041953 filed on Mar. 4, 2014 in the Japan Patent Office, and the entire disclosure of this application is incorporated herein by reference.

FIELD OF THE INVENTION

The present invention relates to a fluororubber molded product and a method for manufacturing the same.

BACKGROUND ART

Fluororubber molded products are excellent in chemical resistance, heat resistance, etc., and use, for example, as various tubes, diaphragm rubber, etc., in medical equipment, automobiles, etc., is being studied.

However, fluororubber molded products are inadequate in low temperature characteristics and especially in a low temperature range of not more than 10° C., there is an issue of large decrease of rubber elasticity.

For example, currently, the abovementioned parts made of conventional fluororubber cannot be used in medical equipment, for which there is a possibility of outdoor use in case of an emergency disaster, or in an automobile used in a cold district, etc.

To improve the low temperature characteristics of a fluororubber molded product, in Patent Document 1 (Japanese Patent Application Publication No. 2011-148902), it is proposed that a composition be prepared by blending a polyalkylene having an amino group in the molecule, and a crosslinking agent in a vinylidene fluoride based non-crosslinked fluororubber and the composition be molded and crosslinked to manufacture a fluororubber product.

In Patent Document 2 (Japanese Patent Application Publication No. 2004-10008) it is proposed that a composition be prepared by blending a liquid perfluoro compound and a precured base, respectively having specific molecular structures, and furthermore a filler and a crosslinking agent and the composition be molded and crosslinked to manufacture a fluororubber product.

BRIEF SUMMARY OF THE INVENTION

However, methods with which the low temperature characteristics are improved by modifying the molecular structure of the fluororubber itself in the crosslinking process such as described in Patent Documents 1 and 2 are poor in general applicability. For example, there is a problem in that cases arise where molding conditions and crosslinking conditions differ from those of a general-purpose fluororubber, etc., to cause a fluororubber molded product manufacturing process to become complicated.

One embodiment, of the present invention provides a fluororubber molded product manufactured by the steps of molding and crosslinking a fluororubber composition and thereafter immersing the composition in a fluorocarbon or an aqueous solution containing a fluorocarbon at a concentration of not less than 10% by volume.

Also another embodiment of the present invention provides a method for manufacturing the fluororubber molded product including a step of molding and crosslinking a fluororubber composition and a step of immersing the composition in a fluorocarbon or an aqueous solution containing a fluorocarbon at a concentration of not less than 10% by volume after the crosslinking.

With the embodiment of the present invention, an ordinary composition containing a general-purpose fluororubber is molded and crosslinked under ordinary conditions and after being crosslinked, the composition is immersed in a fluorocarbon or an aqueous solution containing a fluorocarbon at a concentration of not less than 1.0% by volume. The glass transition temperature Tg can thereby be decreased significantly. The inventor believes that this is due to fluorine atoms in the fluorocarbon being introduced into the polymer skeleton of the crosslinked fluororubber and changing the structure of the fluororubber.

Therefore with the embodiment of the present invention, just by undergoing a simple procedure of immersing in the fluorocarbon or an aqueous solution thereof, the low temperature characteristics are improved significantly and a fluororubber molded product with excellent robber elasticity even in a low temperature range of not more than 10° C. and a method for manufacturing the same can be provided.

BRIEF DESCRIPTION OF THE DRAWINGS

The FIGURE is a graph of relationships between fluorocarbon concentration and glass transition temperature Tg of fluororubber molded products according to examples, comparative examples, and a reference example of the present invention.

DETAILED DESCRIPTION OF EMBODIMENT

One embodiment of the present invention is a fluororubber molded product manufactured by the steps of molding and crosslinking a fluororubber composition and thereafter immersing the composition in a fluorocarbon or an aqueous solution containing a fluorocarbon at a concentration of not less than 10% by volume.

Also another embodiment of the present invention is a method for manufacturing the fluororubber molded product including a step of molding and crosslinking a fluororubber composition and a step of immersing the composition in a fluorocarbon or an aqueous solution containing a fluorocarbon at a concentration of not less than 10% by volume after the crosslinking.

<Fluororubber>

As the fluororubber to be the material of the fluororubber molded product, for example, one type or two or more types of any of various fluororubbers having fluorine inside the molecule, having a crosslinking property, and capable of expressing rubber elasticity upon being crosslinked such as vinylidene fluoride-trifluorochloroethylene binary copolymer, vinylidene fluoride-hexafluoropropylene binary copolymer vinylidene fluoride-hexafluoropropylene-tetrafluoroethylene ternary copolymer, or other vinylidene fluoride based fluororubber (FKM), a tetrafluoroethylene-propylene based fluororubber (FEPM), and tetrafluoroethylene-perfluorovinyl ether based fluororubber (FFKM) can be cited.

Also although fluororubbers are classified according to the typo of crosslinking system (vulcanizing system) into a diamine crosslinking system, a bisphenol or other polyol crosslinking system, a peroxide crosslinking system, etc., any of these may be used. There are also fluororubbers that are supplied with a crosslinking agent being internally added in advance and such crosslinking agent internally added types may also be used.

Among the above, a vinylidene fluoride based fluororubber that is of the bisphenol crosslinking system and crosslinking agent internally added type is used especially favorably because of being excellent in general applicability and handling properties and enabling the forming of a fluororubber molded product that is excellent in rubber elasticity, wear resistance, tensile, strength, etc.

As specific examples of such a vinylidene fluoride based fluororubber that is of the bisphenol crosslinking system and crosslinking agent internally added type, one type or two or more types among A-601C, A-401C, A-201C, etc., of the Viton (registered trademark) series manufactured by DuPont Elastomers Inc. can be cited.

<Additives>

A supplement accelerator, acid accepting agent, auxiliary processing agent, filler, etc., may be blended as necessary in the fluororubber.

Among the above, as the supplement accelerator, for example, calcium hydroxide is used favorably in the case of a bisphenol crosslinking system.

The blending proportion of calcium hydroxide with respect to 100 parts by mass of fluororubber is preferably not less than 3 parts by mass and preferably not more than 10 parts by mass.

Also as examples of the acid accepting agent, magnesium salts such as magnesium oxide, and lead oxide (litharge), etc., can be cited.

The blending proportion of the acid accepting agent with respect to 100 parts by mass of fluororubber is preferably not less than 1 part by mass and preferably not more than 5 parts by mass.

Any of various waxes, etc., can be cited as the auxiliary processing agent. In particular, carnauba wax of any of various grades is preferable.

The blending proportion of the auxiliary processing agent with respect to 100 parts by mass of fluororubber is preferably not less than 0.5 parts by mass and preferably not more than 5 parts by mass.

Carbon black, etc., can be cited as the filler. The blending proportion of carbon black with respect to 100 parts by mass of fluororubber is preferably not less than 20 parts by mass and preferably not more than 40 parts by mass.

If the crosslinking agent internally added type described above is used as the fluororubber, the blending proportions of the respective components mentioned above shall be set within the ranges given above with respect to 100 parts by mass of the total amount of fluororubber including the internally added crosslinking agent.

<Molding and Crosslinking>

The step of molding and crosslinking the fluororubber composition containing the respective components described above may be carried out in the same manner as is done conventionally. That is, as the molding method, any of various molding methods such as a press molding method, extrusion molding method, transfer molding method, and injection molding method may be adopted. With the press molding method and the transfer molding method, the rubber composition may be crosslinked by heating at the same time as molding. Also with any of the other molding methods, after molding to a predetermined shape, crosslinking may be performed by heating using a vulcanizer, etc.

The molding and crosslinking conditions may be set as suited. With the present embodiment, a general-purpose fluororubber is used and therefore the merit that the molding and crosslinking conditions do not need to be adjusted and may be set in the same manner as is done conventionally is provided.

<Fluorocarbon Treatment>

As the fluorocarbon for immersion of the molded and crosslinked fluororubber molded, product precursor, a hydrochlorofluorocarbon (HCFC) whit is low in environmental impact, is especially favorable.

As the HCFC, for example, one type or two or more types among chlorodifluoromethane, 2,2-dichloro-1,1,1-trifluoroethane, 1-fluoro-1,1-dichloroethane, 1-chloro-1,1-difluoroethane, 1,1,1,2,2-pentafluoro-3,3-dichloropropane, 1,3-dichloro-1,1,2,2,3-pentafluoropropane, etc., can be cited.

In particular, for example, Asahiklin (registered trademark) AK-225, which is manufactured by Asahi Glass Co., Ltd. and is a mixture of the two types of fluorocarbon of 1,1,1,2,2-pentafluoro-3,3-dichloropropane and 1,3-dichloro-1,1,2,2,3-pentafluoropropane, is used favorably.

The HCFC or other fluorocarbon may be used in undiluted form or may be diluted in water and used as an aqueous solution. By using an aqueous solution, the usage amount of fluorocarbon can be reduced to decrease the environmental impact and also achieve cost reduction.

However, as shall be made clear from the results of examples to be described below, the concentration of the aqueous solution must be not less than 10% by volume. With an aqueous solution of concentration below this range, the effect of immersion cannot be obtained and the class transition temperature Tg of the fluororubber molded product cannot be decreased.

The conditions of immersion may be set as suited in consideration of the permeation, etc., of the fluorocarbon and in accordance with the thickness, etc. of the molded product. For example, in the as of a thin molded product such as any of various tubes or diaphragm rubber mentioned above, the immersion may be performed at an ordinary temperature (5 to 35° C.) for approximately 5 to 20 minutes.

By undergoing the immersion step, the glass transition temperature Tg can be decreased significantly by the mechanism described above to enable manufacture of a fluororubber molded product with excellent, rubber elasticity even in a low temperature range of not more than 10° C.

The fluororubber molded product according to the embodiment of the present invention can thus be used especially favorably as a molding material of various tubes, diaphragm rubber, etc., for example, in medical equipment, for which there is a possibility of outdoor use in case of an emergency disaster, or in an automobile used in a cold district, etc.

EXAMPLES

Example 1

30 parts by mass of carbon black, 6 parts by mass of calcium hydroxide, and 3 parts by mass of a magnesium salt were blended in 100 parts by mass of a vinyl idene fluoride based fluororubber of the bisphenol crosslinking system and crosslinking agent internally added type [the aforementioned Viton A-601C, manufactured by DuPont Elastomers Inc.] and the composition was kneaded. Thereafter, at 182° C. the composition was press-molded to a predetermined shape and crosslinked to prepare a fluororubber molded product precursor.

The precursor was then immersed at ordinary temperature in a mixture of the two types of fluorocarbon of 1,1,1,2,2- pentafluoro-3,3-dichloropropane and 1,3-dichloro-1,1,2,2,3-pentafluoropropane [the aforementioned Asahiklin AK-225, manufactured by Asahi Glass Co., Ltd.] for 10 minutes and thereafter taken out and dried to manufacture a fluororubber molded product.

Example 2

Besides immersing the same fluororubber molded product precursor as that prepared in Example 1 in an aqueous solution of 25% volume concentration of the fluorocarbon mixture used in Example 1 under the same conditions, a fluororubber molded product was manufactured in the same manner as in Example 1.

Example 3

Besides immersing the same fluororubber molded product precursor as that prepared in Example 1 in an aqueous solution of 10% volume concentration of the fluorocarbon mixture used in Example 1 under the same conditions, a fluororubber molded product was manufactured in the same manner as in Example 1.

Comparable Example 1

Besides immersing the same fluororubber molded product precursor as that prepared in Example 1 in an aqueous solution of 6.7% volume concentration of the fluorocarbon mixture used in Example 1 under the same conditions, a fluororubber molded product was manufactured in the same manner as in Example 1.

Comparable Example 2

Besides immersing the same fluororubber molded product precursor as that prepared in Example 1 in an aqueous solution of 5% volume concentration of the fluorocarbon mixture used in Example 1 under the same conditions, a fluororubber molded product was manufactured in the some manner as in Example 1.

Reference Example 1

The same fluororubber molded product precursor as that prepared in Example 1 was used as it is as a fluororubber molded product without performing the immersion treatment.

<Measurement of Glass Transition Temperature Tg>

For the fluororubber molded product manufactured in each example, comparative example, and reference example, the temperature dependence of the viscoelastic spectrum (tan δ) was measured and the temperature of the peak position of a plot with temperature as the abscissa and tan δ as the ordinate was determined as the glass transition temperature Tg.

The results are shown in Table 1 and The FIGURE.
[Table 1]

TABLE 1

|  | Fluorocarbon concentration (% by volume) | Glass transition temperature Tg (° C.) |
|---|---|---|
| Example 1 | 100 | −7.9 |
| Example 2 | 20 | −8.0 |
| Example 3 | 10 | −8.2 |

TABLE 1-continued

|  | Fluorocarbon concentration (% by volume) | Glass transition temperature Tg (° C.) |
|---|---|---|
| Comparative Example 1 | 6.7 | +1.6 |
| Comparative Example 2 | 5 | +1.8 |
| Reference Example 1 | Not immersed | +2.1 |

From the results of Examples 1 to 3 and Reference Example 1 in Table 1 and The FIGURE, it was found that by making a fluororubber molded product precursor undergo the step of immersion in a fluorocarbon or aqueous solution thereof, the glass transition temperature Tg can be lowered by not less than 10° C. and set below zero to obtain a fluororubber molded product that is improved in low temperature characteristics and is particularly excellent in rubber elasticity even in a low temperature range of not more than 10° C.

However, from the results of Examples 1 to 3 and Comparative Examples 1 and 2, it was found that in the case of using an aqueous solution of a fluorocarbon, an aqueous solution with a concentration of not less than 10% by volume must be used to obtain the above effect.

The invention claimed is:
1. A method for manufacturing fluororubber molded product comprising:
    a step of molding and crosslinking a fluororubber composition to produce a crosslinked composition; and
    a step of immersing the crosslinked composition in a fluorocarbon or an aqueous solution containing a fluorocarbon at a concentration of not less than 10% by volume after the crosslinking to decrease the fluororubber composition glass transition temperature Tg as compared to before the immersion, wherein the conditions of immersion in the fluorocarbon or aqueous solution thereof are 5 to 30° C. and 5 to 20 minutes, so as to produce a fluororubber molded product.
2. The method for manufacturing fluororubber molded product according to claim 1, wherein the fluorocarbon includes a hydrochlorofluorocarbon.
3. The method for manufacturing fluororubber molded product according to claim 2, wherein the hydrochlorofluorocarbon includes a mixture of the two types of fluorocarbon of 1,1,1,2,2-pentafluoro-3,3-dichloropropane and 1,3-dichloro-1,1,2,2,3-pentafluoropropane.
4. The method for manufacturing fluororubber molded product according to claim 1, wherein the fluororubber includes vinylidene fluoride based fluororubber.
5. A method for manufacturing fluororubber molded product comprising:
    a step of molding and crosslinking a fluororubber composition to produce a crosslinked composition; and
    a step of immersing the crosslinked composition in a fluorocarbon or an aqueous solution containing a fluorocarbon at a concentration of not less than 10% by volume after the crosslinking to decrease the fluororubber composition glass transition temperature Tg as compared to before the immersion, wherein the fluorocarbon includes a hydrochlorofluorocarbon including a mixture of the two types of fluorocarbon of 1,1,1,2,2-pentafluoro-3,3-dichloropropane and 1,3-dichloro-1,1,2,2,3-pentafluoropropane, so as to produce a fluororubber molded product.

6. The method for manufacturing fluororubber molded product according to claim 5, wherein the fluororubber includes vinylidene fluoride based fluororubber.

\* \* \* \* \*